2 Sheets--Sheet 1.
MELVILLE CLEMENS.
Improvement in Universal Joint Coupling
for Connecting Shafts.
No. 125,881. Patented April 23, 1872.
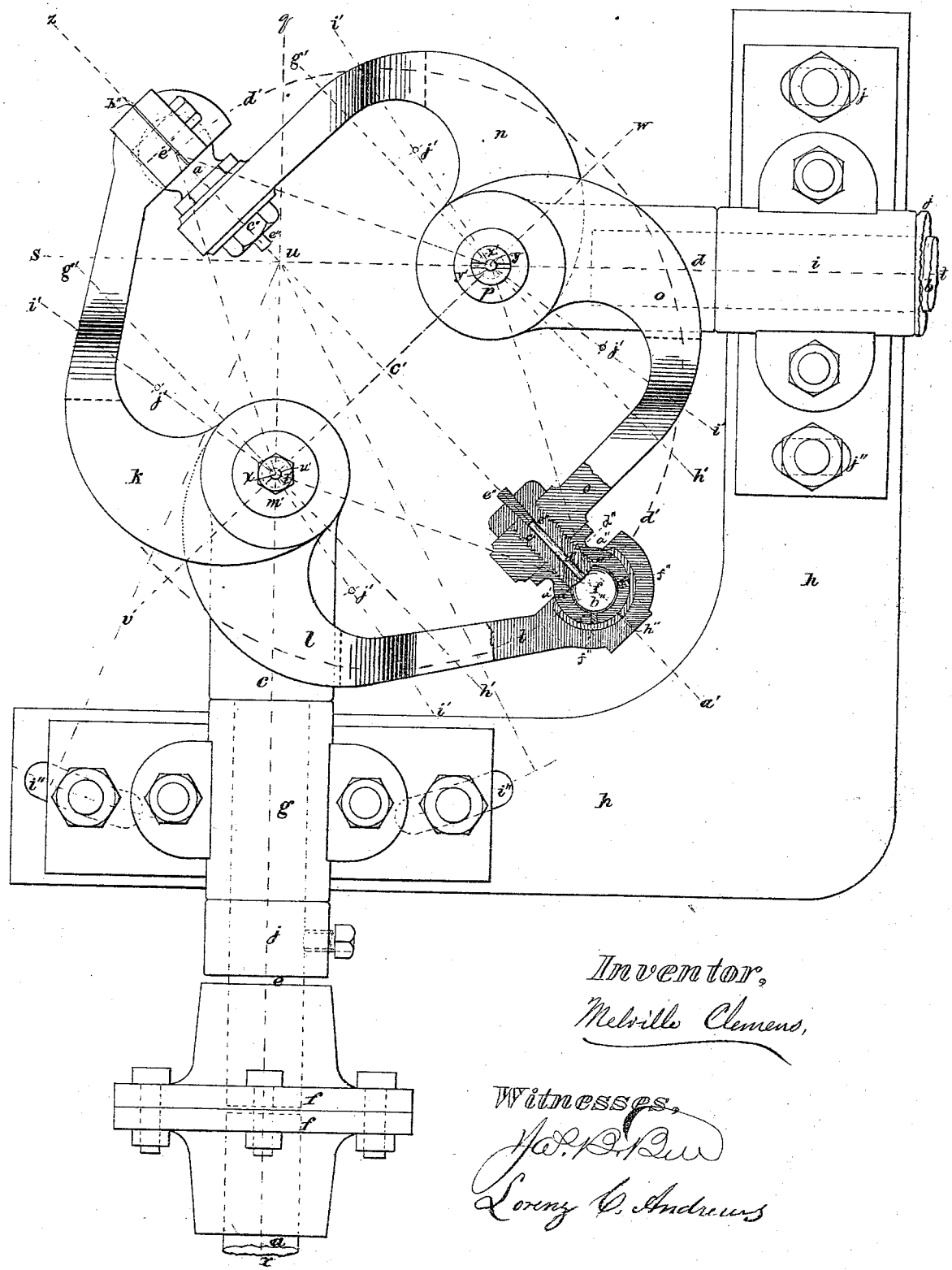
Inventor,
Melville Clemens,
Witnesses,
Lorenz C. Andrews MELVILLE CLEMENS.
Improvement in Universal Joint Coupling
for Connecting Shafts.
No. 125,881.
2 Sheets--Sheet 2.
Patented April 23, 1872.
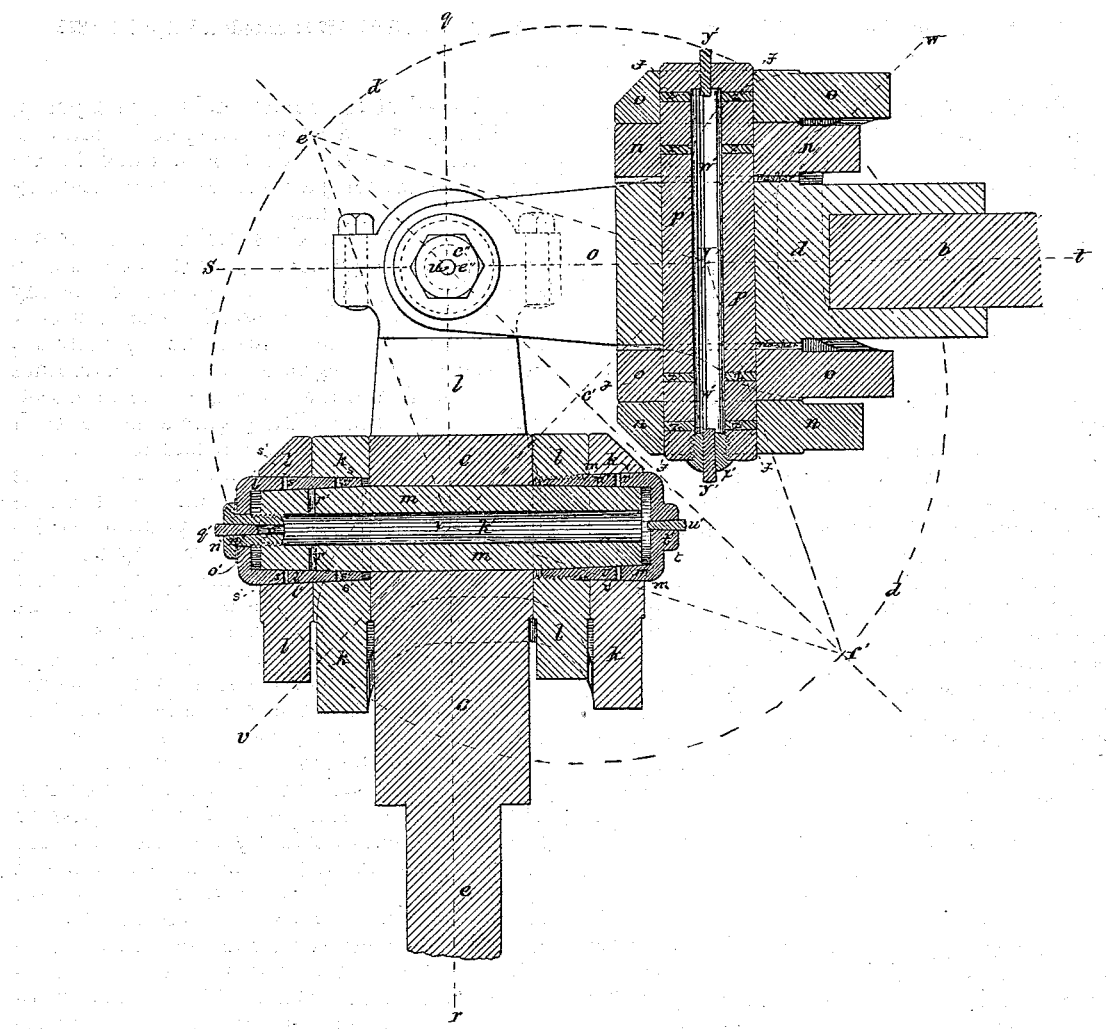
Witnesses,
Inventor,
Melville Clemens,

UNITED STATES PATENT OFFICE.

MELVILLE CLEMENS, OF BOSTON, MASSACHUSETTS.

IMPROVEMENT IN UNIVERSAL-JOINT COUPLINGS FOR CONNECTING SHAFTS.

Specification forming part of Letters Patent No. 125,881, dated April 23, 1872; antedated April 6, 1872.

*To all whom it may concern:*

Be it known that I, MELVILLE CLEMENS, of the city of Boston, in the county of Suffolk and State of Massachusetts, have invented certain new and useful Improvements in my "Apparatus for Transmitting Rotary Motion," (for which apparatus Letters Patent of the United States were issued to me on the second day of November, 1869;) and that I do declare the following to be a full and exact description of said improvements, reference being had to the accompanying drawing making part of this specification.

Figure 1 shows said apparatus and improvements connecting two shafts together at right angles to each other. Fig. 2 shows a section taken through the axes of the shafts when they are revolved one-fourth a revolution from the position of them shown in Fig. 1.

My said improvements consist in so constructing the outer and the inner end pivoted or jointed connections of the "crank arms" of said apparatus, that they are adapted thereby to be self-oiling, and their frictional wearing surfaces to be taken up as they wear loose. Further of said improvements relate to balancing the arms when in motion, and also to adjustments and connections of the apparatus to the shafts which it couples.

I will now describe the construction and operation of the apparatus and of my said improvements.

Referring to the drawing, $a$ and $b$ are two shafts, whose axes are in the same plane and at right angles to each other. $c$ and $d$ are two similar hubs or T-heads, whose axes are in the axis lines of their respective shafts $a$ and $b$. The hub $c$ is extended to form a short journal-shaft, $e$, which is joined to the shaft $a$ by an ordinary flange coupling, $f\!f$, and which revolves in and is supported by a pedestal journal-box, $g$, attached to a yoke-plate, $h$. The shaft $b$ is fastened into a hub, $d$, and revolves in and is supported by the pedestal journal-box $i$, attached to the yoke $h$. $j\,j$ are adjustable collars to prevent end play of the shafts. $k$ and $l$ are like and equal arms, with curved and forked inner ends, which are hinged or pivoted upon a pin, $m$, fixed in the hub $c$ at right angles to and central with its axis. $n$ and $o$ are like and equal arms, curved, forked, and pivoted at their inner ends upon a pin, $p$, fixed in the hub $d$ at right angles to and central with its axis. The arms $k\,n$ and $l\,o$ are joined together in pairs at their outer ends by ball-and-socket joints.

The principles of construction and the operation of the described apparatus, being substantially the same as those set forth in my said patent, will be necessarily described only in general terms, as follows, viz.: $q\,r$ and $s\,t$, intersecting at the point $u$, are the axis lines of the shafts $a$ and $b$. $v\,w$ is a line intersecting the axis lines at the points $x$ and $y$, each equidistant from the point $u$, and locating the centers of the pivot-pins $m$ and $p$. $z\,a'$ is a line bisecting the angle of intersection of the axis lines and passing through the point $u$ and intersecting the line $v\,w$ at $c'$, midway between the points $x$ and $y$. $d'$ is a circle whose center is at $c'$, and whose radius is equal to the line $x\,y$. The points $e'$ and $f'$, at the intersections of the line $z\,a'$ and the circle $d'$, locate the centers of the ball-and-socket joints when the apparatus is in the position shown in Fig. 1. The equal lines $x\,c'$, $x\,f'$, $y\,e'$, and $y\,f'$, measure the lengths of the arms $k$, $l$, $n$, and $o$, and they indicate their relative positions and leverages. The lines $g'\,h'$, parallel to $z\,a'$ and passing through the points $x$ and $y$, are lines in which the centers of gravity of the arms $k$, $l$, $n$, and $o$ were made to fall by curving them, as set forth in said patent; but it is found that when running the apparatus at high speeds, the arms should be more curved, as shown in the drawing, so as to make their centers of gravity fall outward from the lines $g'\,h'$, and in or near the lines $x\,i'$ and $y\,i'$, at points equidistant from $x$ and $y$, as the points $j'\,j'\,j'\,j'$. $i''\,i''$ are slotted bolt-holes in the yoke $h$, curved to a circle whose center is at the point $u$. By means of them and the bolts passing through them, which secure the base of the journal-box $g'$ to the yoke $h$, they enable adjusting the shaft $a$ to greater or less angles of divergence with the shaft $b$ without disturbing the necessary relative positions of the parts of the apparatus for free and perfect operation. This adjustment is in effect pivoting the shafts at the intersection of their axis lines. $j''\,j''$ are slotted bolt-holes in the base of the journal-box $i$, made parallel with the shaft $b$, to enable longitudinal adjustment of it, so as to set the pin $p$ the same distance from the point $u$ that the pin $m$ is placed.

By applying rotary force to revolve the shaft $a$, the described apparatus will cause the shaft $b$ to be revolved the same as $a$. Simultaneously with the rotation of the shafts $a$ and $b$ the arms $k\ l$ and $n\ o$ will be revolved with their respective shafts, and the central points $e'$ and $f'$ of their outer end connections will move in a true circle, whose center is at $c'$, and whose plane of movement is represented by the line $e'\ f'$. The inner ends of the arms thus being revolved in planes at right angles to their respective shaft axes, while their outer ends are revolved in a plane diagonal to and crossing the planes of rotation of their inner ends, produces vibratory pivot movements of the arms, both upon their inner and outer end pivots. These pivot movements, by angular measurement, are in all cases double the angle of divergence of the connected shafts, being for each arm, both at its inner and outer end, one hundred and eighty degrees, when the shafts turn an angle of ninety degrees, as shown in the drawing.

I will now describe in detail my improved methods of constructing the inner and outer end joints or pivots of the arms.

$m$ is one form of pivot-pin, which may be used for inner end pivoting of the arms. It is made fast in the hub $c$, and has an oil-reservoir hole, $k'$, made longitudinally through its center. The projecting ends of the pin are made conical, to fit into bushings $l'$ and $m'$, which last are also made conical externally. The bushing $l'$ fits into conical holes in the hub of the outer fork of the arm $l$ and the hub of the inner fork of the arm $k$. $n'$ is a screw-bolt, passing loosely through a hole made centrally in the end of the bushing $l'$, and screwed into the end of the pin $m$. A washer, $o'$, is placed on the bolt $n'$, between its head and the bushing. $p'$ is an oil-feed hole through the bolt $n'$, leading to the oil-reservoir $k'$, and stopped by a removable plug, $q'$. $r'\ r'$ are outlet oil-holes through the pin $m$, to conduct oil from the reservoir $k'$ to the inside surface of the bushing; and $s'\ s'$ are outlet oil-holes through the bushing, to conduct oil from the inside to the outside surface of the bushing.

If desirable, either or all of the oil-holes $r'\ r'$ and $s'\ s'$ may be plugged with leather or other porous packing, to prevent too free a flow of oil through them.

The bushing $m'$ is screwed, at its inner end, into the hub of the inner fork of the arm $l$, and fits a conical hole in the hub of the outer fork of the arm $k$.

$t'$ is a projecting nut formed on the end of the bushing $m'$, to turn it by in adjusting it. $u'$ is a removable plug, stopping an oil-feed hole through the bushing. $v'\ v'$ are oil-outlet holes through the bushing, to conduct oil from inside of it to the hub of the outer fork of the arm $k$. These holes $v'\ v'$ may be plugged with porous packing, if desirable.

The bushings are adjusted to their proper bearings on the pin and in the hubs, and for taking up wear of their frictional surfaces, by screwing up the bolt $r'$ and the nut $t'$. Either or both the described forms of bushing may be used, as found most desirable.

When the reservoir $k'$ is supplied with oil and the apparatus is in motion, the centrifugal force generated will force the oil toward the ends of the pin, and to the frictional surfaces of the pin and its bushings, and keep them lubricated.

$p$ is another form of pivot-pin, which may be used for the inner-end pivoting of the arms. It is made fast in the hub $d$, and turns in holes in the hubs of the arms $n\ o$. It has an oil-reservoir hole, $w'$, which may be made, as shown, by boring longitudinally nearly through it and closing the hole with a plug, $x'$, through which, and also through the other end of the pin are oil-feed holes, stopped with removable plugs $y'\ y'$. $z'\ z'\ z'\ z'$ are plugs of leather or other porous packing, filling outlet oil-holes for conducting oil from the reservoir $w'$ to the frictional surfaces of the pin $p$, which are in contact with the hubs of the arms $n$ and $o$. The plugs $z'\ z'$ are to prevent too free a flow of oil from the reservoir $w'$ through the outlet oil-holes.

When the reservoir $w'$ is supplied with oil and the apparatus is in motion, the centrifugal force generated will force the oil toward the ends of the pin $p$, and to the frictional surfaces of the pin, and keep them lubricated.

My improved mode of constructing ball-and-socket joints, to make them self-oiling, is shown fully in Fig. 1. $a''$ is the ball, cast or made with an oil-reservoir, $b''$, in it. The ball is secured to its arm by being screwed upon a screw-bolt, $c''$, which is also screwed into the arm carrying the ball, as shown. Through the bolt $c''$ is an oil-feed hole, $d''$, leading to the reservoir $b''$, and stopped by a removable plug, $e''$. $f''\ f''$ are plugs of leather or other porous packing, filling oil-outlet holes for conducting oil from the reservoir $b''$ to the exterior and frictional surface of the ball $a''$, and into the bottom of the ball-box. $h''$ is a piece of leather or other suitable packing, placed between the two halves of the ball-box, to make the joint tight. The plugs $f''\ f''$ are not indispensably necessary when the packing $h''$ is used, for oil flowing from the ball would be retained in the box.

When the reservoir $b''$ is supplied with oil and the apparatus is set in motion, the centrifugal force generated will force oil out of the ball into the ball-box, and the same force acts to keep the oil from flowing too freely out of the box; but the oil will gradually work out of the box around the neck of the ball, and thus exclude and carry out dust and grit from the box.

This is an important improvement, for the durability of ball-and-socket joints, for their construction and action is such, commonly, as to be difficult to be kept oiled, and they work grit and dust into the box, and thus rapidly wear out the joint, which results my described improvement obviates.

I claim as new and of my invention—

1. A ball-and-socket joint, adapted to be self-oiled from an oil-reservoir within the ball, for the purposes set forth.

2. The described hollow ball-and-socket joints employed in the described apparatus or for other similar uses, substantially as and for the purposes set forth.

3. The self-oiling pivot-pin $m$, with bushings $l'$ and $m'$, constructed and adapted together, and employed in the described apparatus, or for other similar uses, substantially as and for the purposes set forth.

4. The self-oiling pivot-pin $p$, constructed substantially as described and employed in the described apparatus, substantially as and for the purposes set forth.

MELVILLE CLEMENS.

Witnesses:
 JOS. B. BELL,
 ALLAH W. WRIGHT.